(12) United States Patent
Hierse et al.

(10) Patent No.: US 8,338,507 B2
(45) Date of Patent: Dec. 25, 2012

(54) USE OF PHOSPHINIC ACIDS AND/OR PHOSPHONIC ACIDS IN POLYMERISATION PROCESSES

(75) Inventors: Wolfgang Hierse, Gross-Zimmern (DE); Nikolai (Mykola) Ignatyev, Duisburg (DE)

(73) Assignee: Merck Patent Gesellschaft mit Beschränkter Haftung, Darmstadt (DE)

( * ) Notice: Subject to any disclaimer, the term of this patent is extended or adjusted under 35 U.S.C. 154(b) by 216 days.

(21) Appl. No.: 12/746,108

(22) PCT Filed: Nov. 22, 2008

(86) PCT No.: PCT/EP2008/009920
§ 371 (c)(1),
(2), (4) Date: Jun. 3, 2010

(87) PCT Pub. No.: WO2009/071214
PCT Pub. Date: Jun. 11, 2009

(65) Prior Publication Data
US 2010/0273921 A1    Oct. 28, 2010

(30) Foreign Application Priority Data
Dec. 4, 2007   (DE) .......................... 10 2007 058 600

(51) Int. Cl.
*C09D 101/18*   (2006.01)
*C08G 18/48*    (2006.01)

(52) U.S. Cl. ........... 524/32; 524/130; 524/133; 524/135
(58) Field of Classification Search .................. 524/130, 524/133, 135
See application file for complete search history.

(56) References Cited

U.S. PATENT DOCUMENTS

| 4,824,886 | A  |   | 4/1989  | Schmidt et al. |
| 7,811,949 | B2 | * | 10/2010 | Snowden et al. ............... 442/67 |

FOREIGN PATENT DOCUMENTS

| EP | 0070498       | A1 | 1/1983  |
| EP | 0070498       | W  | 1/1983  |
| EP | 0238825       | A2 | 9/1987  |
| EP | 0341716       | A2 | 11/1989 |
| GB | 1572863       | A  | 8/1980  |
| JP | 5339537       | A  | 12/1993 |
| JP | 5339537       | W  | 12/1993 |
| WO | 03082884      | A1 | 10/2003 |
| WO | PCTEP0809920  | R  | 7/2009  |

* cited by examiner

*Primary Examiner* — Terressa Boykin
(74) *Attorney, Agent, or Firm* — Millen, White, Zelano & Branigan, P.C.

(57) ABSTRACT

The present invention relates to the use of phosphinic acids and/or phosphonic acids and salts thereof for wetting fluorine compounds, in particular fluoropolymers, to the use in coating solutions comprising fluorine compounds, and to polymerisation processes in which fluorine compounds are used and/or formed.

14 Claims, No Drawings

USE OF PHOSPHINIC ACIDS AND/OR PHOSPHONIC ACIDS IN POLYMERISATION PROCESSES

The present invention relates to the use of phosphinic acids and/or phosphonic acids and salts thereof for wetting fluorine compounds, preferably for the preparation of suspensions or emulsions of fluorine compounds, to the use in coating solutions comprising fluorine compounds, and to the use in suspension and emulsion polymerisation processes in which fluorine compounds are used and/or formed.

The wetting and dispersal of solid fluoropolymer particles or the emulsification of liquid fluorohydrocarbon droplets in aqueous media is an industrial problem of major importance, in particular in the preparation of fluoropolymers.

An important industrial method for the preparation of fluoropolymers, such as, for example, polytetrafluoroethylene (PTFE), is emulsion polymerisation. In this process, the polymer is prepared in an autoclave containing water, the corresponding, usually gaseous, monomer(s), initiators, surfactants and other assistants, with stirring and constant temperature and pressure control. Surfactants are used, inter alia, to keep the very hydrophobic fluoropolymer droplets or particles dispersed in the aqueous solution.

Fluoropolymers such as PTFE are frequently used as additives in coating formulations. They reduce the coefficient of friction and the surface energy of the coating after curing and improve important technical parameters, such as, for example, scratch resistance, dirt-repellent properties, etc. Here too, the fluoropolymer particles must be dispersed in the coating formulation, which may be aqueous or non-aqueous.

In latex coatings based on fluoropolymer resins, the fluoropolymer particles must also be dispersed in the normally aqueous coating formulation in order that the latex remains stable and phase separation does not occur.

In electroplating applications, in particular in the currentless nickel process, fluoropolymer particles are sometimes integrated into the metal layer formed on the substrate in order to improve surface properties, such as the coefficient of friction. Here too, the fluoropolymer particles must firstly be suspended again in the aqueous electroplating bath in a stable manner before they can be deposited on the substrate.

In order to prepare stable dispersions or suspension of fluoropolymers in aqueous media, it is necessary to use fluorosurfactants, which contain both a hydrophilic head group and also a perfluorinated group. Non-fluorinated surfactants containing hydrocarbon or methylsiloxane groups normally cannot be employed since fluoropolymers are both hydrophobic and lipophobic.

In recent years, some classes of fluorosurfactants have been subjected to ever greater production and application restrictions owing to their persistence in the environment, their bioaccumulating properties and their toxicity (the so-called PBT properties). Surfactants such as perfluorooctylsulfonate (PFOS) and perfluorooctanoic acid (PFOA) are also affected by this. In particular, PFOA salts, such as the ammonium salt of perfluorooctanoic acid (APFO), have to date frequently been employed as surfactants in the emulsion polymerisation of PTFE and were responsible for groundwater pollution in the USA.

There is therefore a need to replace PBT fluorosurfactants with substances having similar technical properties, but improved degradation behaviour. Accordingly, the object of the present invention is to provide alternative compounds for the wetting and dispersal of solid fluoropolymer particles or for the emulsification of liquid fluorohydrocarbon droplets.

The above-mentioned object is achieved by the use of phosphinic acids or salts thereof and/or phosphonic acids or salts thereof for wetting fluorine compounds, by coating solutions comprising such compounds and by suspension and emulsion polymerisation processes in which such compounds are used.

The phosphinic acids or salts thereof and/or phosphonic acids or salts thereof are preferably used for the preparation of, in particular aqueous, suspensions or emulsions of fluorine compounds. In addition, the compounds essential to the invention are preferably employed for the preparation of fluoropolymers.

The phosphinic acids essential to the invention and/or salts thereof are preferably those of the general formula (I)

where $Rf^1$ and $Rf^2$ may each, independently of one another, be branched or unbranched alkyl chains of the formula $C_nF_{2n-z+1}H_z$, where n=2-16, z=0-3, and in which Z=H, alkali metal or $[NR_4]^+$. Compounds of the general formula (I) are known from WO 03/082884, where they are employed in optical systems.

Preference is given to the use of compounds where X=alkali metal or $[NR_4]^+$. In a variant of the invention, compounds where X=$[NR_4]^+$ are preferably used. Furthermore, preference is given to compounds in which n=4-8. A preferred value for z is 0. In the said phosphinic acids and/or salts thereof, $Rf^1$ and $Rf^2$ may be identical or different. Particular preference is given to compounds in which $Rf^1$ and $Rf^2$ are identical.

The phosphonic acids essential to the invention and/or salts thereof are those of the general formula (II)

where $Rf^1$ denotes branched or unbranched alkyl chains of the formula $C_nF_{2n-z+1}H_z$, where n=2-16, z=0-3, and in which X and X', independently of one another, denote H, alkali metal or $[NR_4]^+$.

Preference is given to the use of compounds where X and/or X'=alkali metal or $[NR_4]^+$. In a variant of the invention, preference is given to the use of compounds where X and/or X'=$[NR_4]^+$. Furthermore, preference is given to compounds in which n=4-8. A preferred value for z is 0. In the said phosphonic acids, X and X' may be identical or different, X and X' are preferably identical.

If X and/or X'=alkali metal, this means, both for the phosphinic acid salts according to the invention and also for the phosphonic acid salts according to the invention, in particular lithium, sodium or potassium, preferably potassium or sodium.

In the case of X and/or X'=$[NR_4]^+$, R, both for the phosphinic acid salts according to the invention and also for the phosphonic acid salts according to the invention, in each case, independently of one another, denotes H, straight-chain or branched alkyl having 1-20 C atoms, saturated cycloalkyl having 3-7 C atoms aryl, or alkyl-aryl, which may be substituted by alkyl groups having 1-6 C atoms, where one or more R may be partially or fully substituted by halogens, in particular —F. R preferably =H, straight-chain or branched alkyl having 1-4 C atoms, in particular =H, $CH_3$. In a particularly preferred variant of the invention, X and/or X'=$[NH_4]^+$.

The alkyl chains of $Rf^1$ and $Rf^2$ are preferably unbranched. Particularly preferred phosphinic acids and/or salts thereof of the formula (I) or phosphonic acids and/or salts thereof of the formula (II) are those where n=4 or 6, z=0 and X and/or X'=H or alkali metal or $[NR_4]^+$, in particular where X=H or $[NH_4]^+$.

As particularly preferred compounds of the formulae I and II, use is made of compounds in which both X, R, $Rf^1$ and $Rf^2$ and also n and z have the respective preferred meanings. The following phosphinic acids and/or salts thereof are particularly preferred: $(C_4F_9)_2P(O)OH$ and $(C_6F_{13})_2P(O)OH$ or the corresponding alkali metal or ammonium salts. The following phosphonic acids and/or salts thereof are particularly preferred: $(C_4F_9)P(O)(OH)_2$ and $(C_6F_{13})P(O)(OH)_2$ or the corresponding alkali metal or ammonium salts.

The alternative fluorosurfactants according to the invention are suitable as wetting agents and dispersants for fluorine compounds, in particular for fluoropolymers, or as emulsifiers for organofluorine liquids in aqueous media. The essential property which differentiates the present fluorine compounds from conventional fluorosurfactants is their hydrolysability in alkaline, in particular in hot alkaline, solutions to give fluorohydrocarbon products which are acceptable with respect to their environmental acceptability, since they photooxidise in the atmosphere and have no ozone-damaging potential. This offers the possibility of treating residues and waste from industrial processes simply using standard chemicals, so that the surfactants are chemically destroyed and are not released into the environment. In contrast to fluorosurfactants such as PFOS and PFOA, which are essentially stable to hydrolysis, the sensitivity of the compounds essential to the invention to hydrolytic cleavage can contribute to reducing their environmental life time to an acceptable level.

The phosphinic acids or salts thereof and/or phosphonic acids or salts thereof according to the invention can be used, in particular, for the preparation of stable emulsions and suspensions of fluorine compounds, especially of fluoropolymers. They are preferably suitable as dispersants or emulsifiers in polymerisation processes. The phosphinic acids and salts thereof and the phosphonic acids and salts thereof are basically suitable for all polymerisation processes known to the person skilled in the art, but in particular for emulsion and suspension polymerisation processes.

In emulsion and suspension polymerisation processes in particular, high requirements are made of the surface-active compounds used for wetting the starting materials and products. In particular in the preparation of fluoropolymers by means of emulsion or suspension polymerisation, specific surfactants are required since fluoropolymers are both hydrophobic and lipophobic. The alternative fluorine-containing compounds according to the invention are particularly suitable for these applications.

Suspension and emulsion polymerisation processes are standard polymerisation processes which are well known to the person skilled in the art. In suspension and emulsion polymerisation processes, the system always comprises at least four constituents: (predominantly) water-insoluble monomer, water, dispersant or emulsifier, and initiator.

In suspension polymerisation, predominantly water-insoluble monomers are employed, which are distributed as discontinuous phase in the form of fine droplets in a continuous water phase with stirring. The polymerisation is initiated by oil-soluble initiators, i.e. ones which are dissolved in the monomers. Coagulation of the droplets is prevented by added dispersants. The resultant polymers are obtained in the form of small beads.

In emulsion polymerisation, water-insoluble monomers are solubilised in water with the aid of emulsifiers by introducing them into the micelles formed by the emulsifier. The monomers emulsified in this way are then polymerised using water-soluble initiators. The polymerisation causes the micelles to become ever larger and finally to be converted into spherical polymer particles, so-called latex particles. The resultant polymers can be employed directly in many applications.

The performance of the said polymerisation processes is familiar to the person skilled in the art. The processes according to the invention have the advantage that they result in stable polymer dispersions in a simple manner and after appropriate work-up, few environmentally hazardous residues are formed.

In a further embodiment of the present invention, the phosphinic acids or salts thereof and/or phosphonic acids or salts thereof can be employed in combination with further surface-active substances. Suitable for this purpose are in principle all types of surface-active substance known to the person skilled in the art, preferably the surface-active substances selected from the group of the perfluoroalkylsulfonates, in particular perfluorooctyl-sulfonic acid (PFOS) or salts thereof. However, the proportion of surface-active substance to be added can be reduced in many cases through the use of the alternative fluorosurfactants which are essential to the invention.

The said phosphinic and phosphonic acids or the salts of the phosphinic and phosphonic acids prove to be particularly stable under the conventional polymerisation conditions. Thus, the said compounds according to the invention are also resistant to strongly acidic media, have high stability and result in stable polymerisation phases in the said polymerisation processes. The use of the compounds which are essential to the invention can have considerable benefits in the application, such as, for example, improved wetting of the starting materials and products, in particular solid fluoro-polymer particles, and a more uniform course of the polymerisation.

In addition, the compounds according to the invention can be hydrolysed in alkaline media, with the formation of non-environmentally harmful hydrocarbons $R_fH$, which are able to photooxidise in the atmosphere and have no ozone-damaging potential. This is a particular advantage, especially compared with the use of perfluoroalkylsulfonic acids and salts thereof, since the polymerisation solutions and/or residues can now be treated chemically in a simpler manner with destruction of the surface-active substance.

The complete or partial replacement claimed in accordance with the invention of perfluoroalkylsulfonic acids and salts thereof in the polymerisation processes reduces the release of persistent, toxic and bioaccumulative perfluoroalkylsulfonic acids, such as, for example, perfluorooctylsulfonate, into the environment. In addition, the said compounds have the advantage, on use thereof in polymerisation processes, of there being a reduced risk of long-term environmental pollution with chemical waste which cannot be degraded.

Apart from the preferred compounds mentioned in the description, the use thereof, compositions and processes, further preferred combinations of the subject-matters according to the invention are disclosed in the Claims.

The following examples explain the present invention in greater detail without restricting the scope of protection. In particular, the features, properties and advantages, described in the examples, of the compounds on which the relevant examples are based can also be applied to other substances and compounds which are not described in detail, but fall within the scope of protection, unless stated otherwise elsewhere. In addition, the invention can be carried out throughout the range claimed and is not restricted to the examples given here.

EXAMPLES

Test of the efficacy of $(C_4F_9)_2P(O)O^-NH_4^+$ for the wetting and dispersal of polytetrafluoroethylene (PTFE) particles in water:

For this purpose, the ammonium salts of $(C_4F_9)_2P(O)OH$ (bis(nonafluorobutyl)phosphinic acid)) and $C_7F_{15}C(O)OH$ (perfluorooctanoic acid, prior art) are prepared and compared with one another with respect to their dispersal action on PTFE particles (Perflutel 290, manufacturer Miteni) in water.

The dispersal action is determined visually by a shaking test in transparent sample bottles (glass, 25 ml), in which the dispersal of the PTFE particles is carried out with the aid of a shaking apparatus (model VV3, manufacturer Vortex) and an ultrasound bath (model RK 52H, manufacturer Bandelin).

For this purpose, a defined amount of wetting-agent solution (ammonium salts of $(C_4F_9)_2P(O)OH$ and PFOA) is initially introduced into the sample bottles, and the PTFE powder is added. After dispersal, a visual comparison is made regarding whether wetting of the PTFE particles takes place (hydrophobic PTFE particles are stabilised in water) or whether the PTFE particles remain unwetted (hydrophobic PTFE particles float on the surface). The reference used is a 0 sample without dispersion additive.

The following samples are prepared for the dispersion test:
Sample 1: $H_2O$+PTFE powder (0 sample)
Sample 2: Aqueous solution of $C_7F_{15}C(O)O^-NH_4^+$PTFE powder
Sample 3: Aqueous solution of $(C_4F_9)_2P(O)O^-NH_4^+$PTFE powder The precise weights of sample 1-3 are shown in the following tables (Table 1-3).

TABLE 1

Preparation of the ammonia solution for sample 2 and 3

| Sample | Weight of $NH_4^+OH^-$ solution [g] | Weight of deionised $H_2O$ [g] | Concentration [mol/l] |
|---|---|---|---|
| — | 0.88 (32%) | 165.01 | 0.1 |
| 2 | 5.0018 (0.1M) | 5.0325 | 0.05 |
| 3 | 7.5113 (0.1M) | 7.5179 | 0.05 |

The ammonia solutions for sample 2 and 3 are prepared under the following assumption: density (0.1M ammonia solution)=1 g/cm³. The ammonia solution is added to the dispersion additives in a stoichiometric ratio (see Table 2)

TABLE 2

Preparation of the ammonium salts for sample 2 and 3

| Sample | Weight of $NH_4^+OH^-$ solution [g] | Weight of dispersion additives [g] | Concentration of salt [mol/l] |
|---|---|---|---|
| 2 | 10.0343 (0.05M) | 0.2168 (PFOA) | 0.05 |
| 3 | 9.4990 (0.05M) | 0.2237 $((C_4F_9)_2P(O)OH)$ | 0.05 |

The salt solutions are brought into solution with the aid of the shaking apparatus (2 min at speed 6) and the ultrasound bath (10 min). Transparent solutions form. The PTFE powder is then added to the sample bottles (see Table 3).

TABLE 3

Preparation of the dispersions

| Samples | Weight of salt solution/$H_2O$[g] | Weight of Perflutel 290 [g] | Concentration of PTFE powder Perflutel 290 [%] |
|---|---|---|---|
| 1 | 10.0156 $H_2O$ | 0.9884 g | 9% |
| 2 | 10.2511 $C_7F_{15}C(O)O^-NH_4^+$ | 0.9970 | 9% |
| 3 | 9.7227 $(C_4F_9)_2P(O)O^-NH_4^+$ | 0.9720 | 9% |

For sample 1-3, the dispersal of the PTFE powder is carried out using the shaking apparatus (2 min at speed 6) and the ultrasound bath (40 min). The results of the dispersion test are shown in Table 4 and show that both $C_7F_{15}C(O)O^-NH_4^+$ (ammonium salt of PFOA) and $(C_4F_9)_2P(O)O^-NH_4^+$ (ammonium salt of bis(nonafluorobutyl)phosphinic acid) has a wetting action on the PTFE particles. In contrast to the 0 sample, in which the particles separate at the surface, the particles are wetted by the surfactant solutions and sink downwards. This effect is somewhat more pronounced for PFOA than for $(C_4F_9)_2P(O)OH$ with comparable additive and PTFE powder concentrations.

TABLE 4

Results of the dispersion test

| | Sample 1 | Sample 2 | Sample 3 |
|---|---|---|---|
| Concentration of dispersion additive | 0% | 2.0% of $C_7F_{15}C(O)O^-NH_4^+$ | 2.2% of $(C_4F_9)_2P(O)O^-NH_4^+$ |
| Concentration of PTFE | 9% | 9% | 9% |
| Observation | PTFE powder separates at surface | PTFE powder sinks downwards | PTFE powder sinks downwards, some accumulates at the top |

B) Degradability
Hydrolysis in Alkaline Solution

After 450 mg of $(C_4F_9)_2P(O)OH$ have been mixed with 4.5 ml of 20% aqueous NaOH solution, a precipitate of $(C_4F_9)_2P(O)ONa$ immediately forms, which has limited water solubility. The precipitate dissolves completely within three days at room temperature due to hydrolysis of $(C_4F_9)_2P(O)ONa$ to give $(C_4F_9)P(O)(ONa)_2$. The product formed comprises gaseous $C_4F_9H$, also known as HFC-329 ccb, which is regarded by the US EPA as a possible substitute for HFCs. The second step in the hydrolysis to give $Na_3PO_4$ takes place slowly, even at 80° C. On the basis of the data for non-bioaccumulating PFBS ($C_4F_9SO_3H$), it is expected that $C_4F_9P(O)(ONa)_2$, whose anion is more hydrophilic owing to the additional negative charge compared with PFBS, will also be non-bioaccumulating.

The invention claimed is:
1. A method comprising contacting a phosphinic acid or salt thereof and/or a phosphonic acid or salt thereof with a fluorine compound for wetting of the fluorine compound;
wherein the phosphinic acid or salt thereof is of the formula (I)

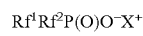

$Rf^1Rf^2P(O)O^-X^+$     (I)

where $Rf^1$ and $Rf^2$ are each, independently of one another, branched or unbranched alkyl chains of the formula $C_nF_{2n-z+1}H_z$, where n=2-16, z=0-3, and in which X=H, alkali metal or $[NR_4]^+$, where R in each case, independently of one another, denotes H, straight-chain or branched alkyl having 1-20 C atoms, saturated cycloalkyl having 3-7 C atoms aryl or alkyl-aryl, which are optionally substituted by alkyl groups having 1-6 C atoms, and one or more R is optionally partially or fully substituted by halogen; and wherein the phosphonic acid or salt thereof is of the formula (II)

  (II)

where $Rf^1$ is as defined above.

2. A method according to claim 1, wherein the resulting wetted fluorine compound is in the form of a suspension or emulsion.

3. A method according to claim 1, wherein the wetted fluorine compound is a fluorohydrocarbon or fluoropolymer.

4. A method according to claim 1, further comprising subjecting the wetted fluorine compound to a polymerisation process.

5. A method according to claim 4, wherein the polymerisation process is a suspension or emulsion polymerisation process.

6. A method according to claim 1, wherein the fluorine compound is contacted with a phosphinic acid or salt thereof selected from $(C_4F_9)_2P(O)OH$, $(C_6F_{13})_2P(O)OH$ and corresponding alkali metal salts thereof.

7. A method according to claim 1, wherein the fluorine compound is contacted with a phosphonic acid or salt thereof selected from (C4F9)P(O)(OH)2, (C6F13)P(O)(OH)2 and corresponding alkali metal salts thereof.

8. A method according to claim 1, characterised in wherein the contacting of the phosphinic acid or salt thereof and/or phosphonic acid or salt thereof with the fluorine compound is conducted further in the presence of a surface-active substance.

9. A coating solution comprising a phosphinic acid or salt thereof and/or a phosphonic acid or salt thereof and at least one fluoropolymer and/or at least one fluorohydrocarbon;

wherein the phosphinic acid or salt thereof is of the formula (I)

  (I)

where $Rf^1$ and $Rf^2$ are each, independently of one another, branched or unbranched alkyl chains of the formula $C_nF_{2n-z+1}H_z$, where n=2-16, z=0-3, and in which X=H, alkali metal or $[NR_4]^+$, where R in each case, independently of one another, denotes H, straight-chain or branched alkyl having 1-20 C atoms, saturated cycloalkyl having 3-7 C atoms aryl or alkyl-aryl, which are optionally substituted by alkyl groups having 1-6 C atoms, and one or more R is optionally partially or fully substituted by halogen; and wherein the phosphonic acid or salt thereof is of the formula (II)

  (II)

where $Rf^1$ is as defined above.

10. A polymerisation process for preparing a fluoropolymer, wherein the polymerization process is conducted in the presence of a phosphinic acid or salt thereof and/or phosphonic acid or salt thereof as surface-active substance;

wherein the phosphinic acid or salt thereof is of the formula (I)

  (I)

where $Rf^1$ and $Rf^2$ are each, independently of one another, branched or unbranched alkyl chains of the formula $C_nF_{2n-z+1}H_z$, where n=2-16, z=0-3, and in which X=H, alkali metal or $[NR_4]^+$, where R in each case, independently of one another, denotes H, straight-chain or branched alkyl having 1-20 C atoms, saturated cycloalkyl having 3-7 C atoms aryl or alkyl-aryl, which are optionally substituted by alkyl groups having 1-6 C atoms, and one or more R is optionally partially or fully substituted by halogen; and wherein the phosphonic acid or salt thereof is of the formula (II)

  (II)

where $Rf^1$ is as defined above.

11. A polymerisation process according to claim 10, wherein the polymerisation process is a suspension or emulsion polymerisation process.

12. A polymerisation process according claim 10, wherein the process is conducted in the presence of a phosphinic acid or salt thereof selected from (C4F9)2P(O)OH, (C6F13)2P(O)OH and corresponding alkali metal salts thereof.

13. A polymerisation process according to claim 10, wherein the process is conducted in the presence of a phosphonic acid or salt thereof selected from (C4F9)P(O)(OH)2, and (C6F13)P(O)(OH)2 and corresponding alkali metal salts thereof.

14. A polymerisation process according to claim 10, wherein the polymerization process is an emulsion polymerization process for preparing polytetrafluoroethylene.

* * * * *